United States Patent
Amada et al.

(10) Patent No.: US 6,429,985 B2
(45) Date of Patent: Aug. 6, 2002

(54) DIGITAL INFORMATION RECORDING APPARATUS AND DIGITAL INFORMATION RECORDING AND REPRODUCING APPARATUS

(75) Inventors: Nobutaka Amada; Takaharu Noguchi; Takao Arai, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/851,249

(22) Filed: May 9, 2001

Related U.S. Application Data

(63) Continuation of application No. 08/405,288, filed on Mar. 16, 1995.

(30) Foreign Application Priority Data

Mar. 16, 1994 (JP) .............................................. 6-045993

(51) Int. Cl.$^7$ .............................. G11B 5/09; G11B 15/46
(52) U.S. Cl. ........................ 360/39; 360/73.04; 386/68; 386/81
(58) Field of Search .............................. 360/39, 48, 29, 360/73.04; 386/68, 81, 40, 124

(56) References Cited

U.S. PATENT DOCUMENTS

| | | | |
|---|---|---|---|
| 4,862,292 A | 8/1989 | Enari et al. | |
| 4,905,104 A | 2/1990 | Okamoto et al. | |
| 4,963,991 A | 10/1990 | Honjo | |
| 4,984,101 A | 1/1991 | Kanota et al. | |
| 5,065,259 A | 11/1991 | Kubota et al. | |
| 5,231,543 A | 7/1993 | Kubota et al. | |
| 5,247,396 A | 9/1993 | Nagai et al. | |
| 5,307,171 A | 4/1994 | Azuma et al. | |
| 5,317,413 A | 5/1994 | Yanagihara | |
| 5,337,199 A | 8/1994 | Arai et al. | |
| 5,519,547 A | * 5/1996 | Yamasaki et al. | .............. 360/64 |

FOREIGN PATENT DOCUMENTS

GB    2217509    10/1989

OTHER PUBLICATIONS

IEEE Translation on Consumer Electronics, vol. 34, No. 3, Aug. 88, pp. 588–596.
IEEE Translation on Consumer Electronics, vol. 34, No. 3, Aug. 88, pp. 597–605.

\* cited by examiner

*Primary Examiner*—Regina N. Holder
(74) *Attorney, Agent, or Firm*—Antonelli, Terry, Stout & Kraus, LLP

(57) ABSTRACT

A digital information recording apparatus having a first recording mode recording a first digital information signal of a first information rate on a magnetic tape and a second recording mode recording a second digital information signal of a second information rate on the magnetic tape. The apparatus includes a circuit which when the second information rate is less than 1/N times the first information rate (N is an integer $\geq 2$), adds a dummy signal to the second digital information signal to make the recording rate of the second digital information signal substantially equal to the recording rate of the first digital information signal and a circuit which multiplexes identification signals for identifying the first and the second digital information signals or the first and the second recording rates on the first or the second digital information signal, for recording.

8 Claims, 13 Drawing Sheets

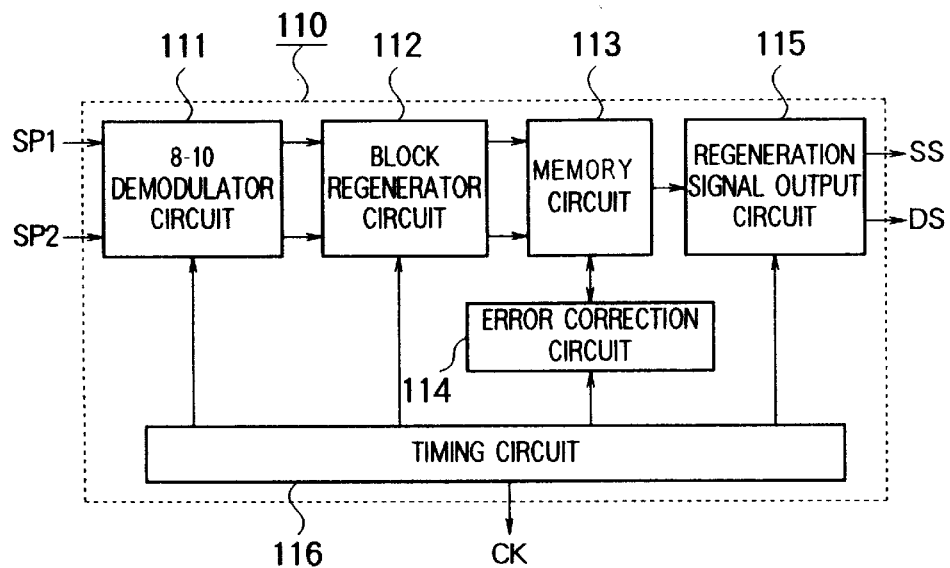
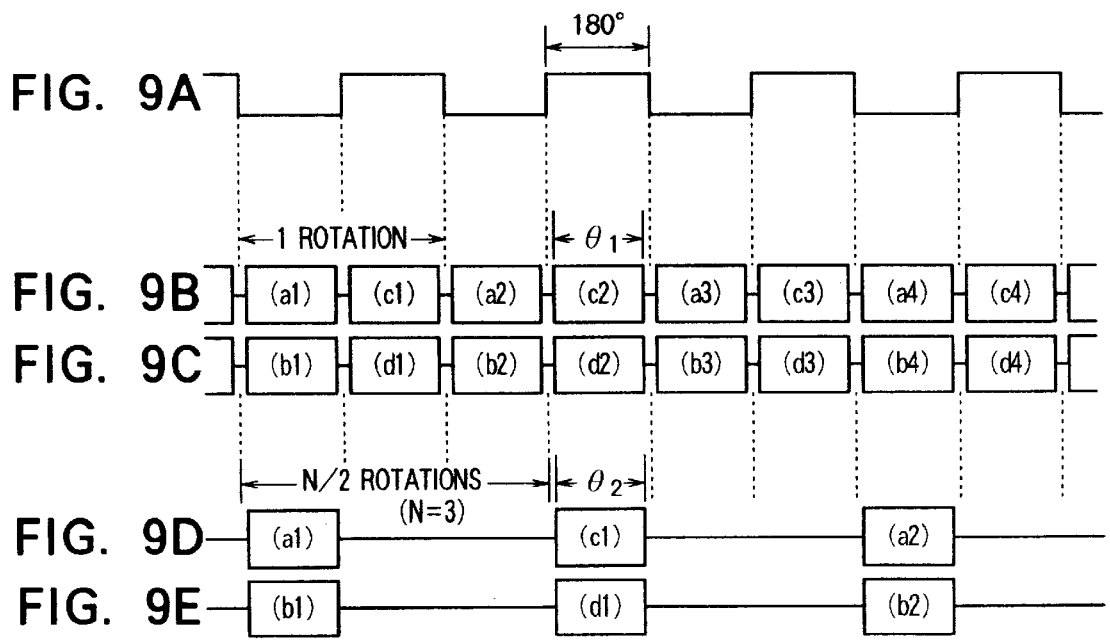

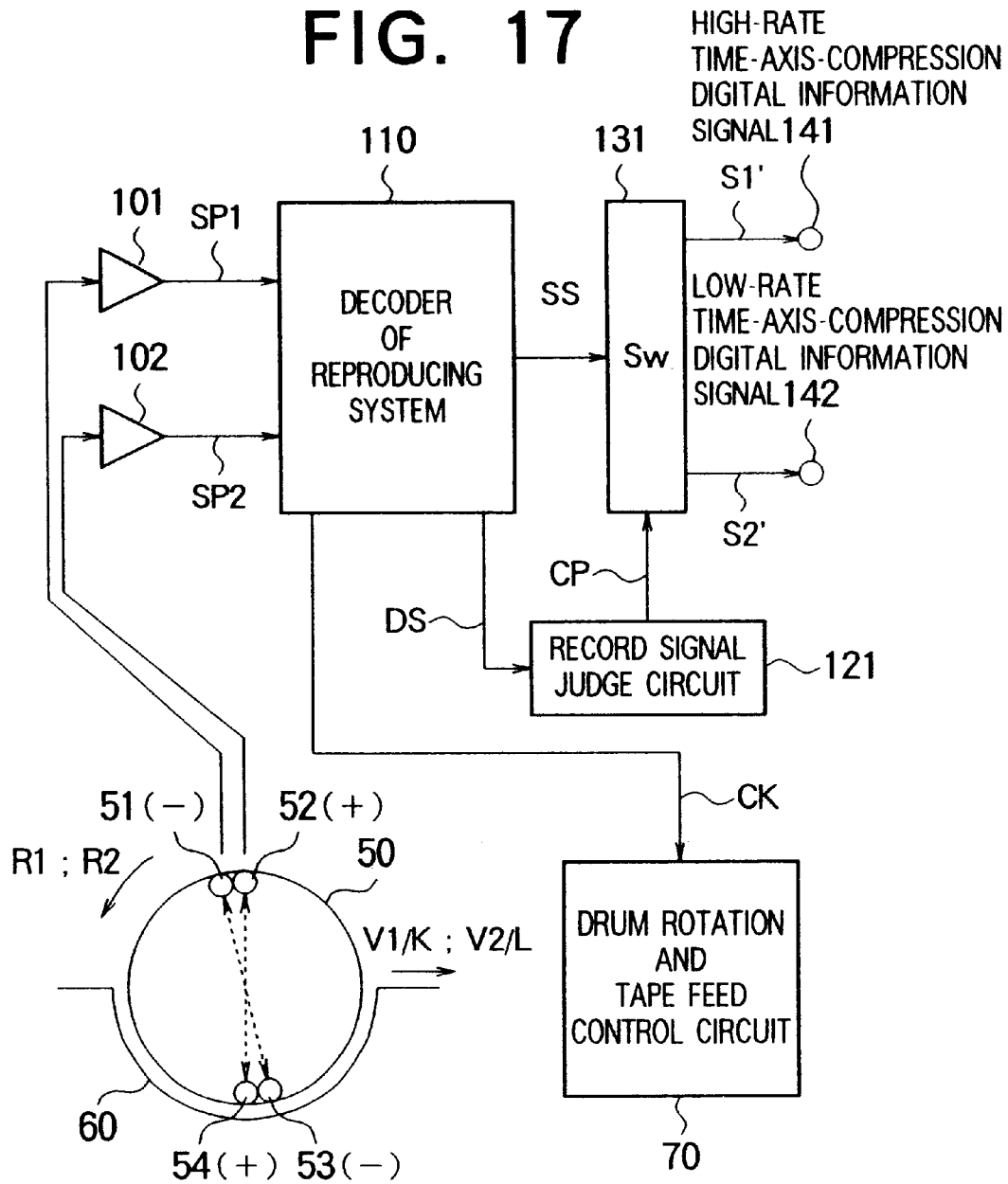

DIGITAL INFORMATION RECORDING APPARATUS AND DIGITAL INFORMATION RECORDING AND REPRODUCING APPARATUS

CROSS REFERENCE TO RELATED APPLICATION

This is a continuation of U.S. application Ser. No. 08/405,288, filed Mar. 16, 1995, the subject matter of which is incorporated by reference herein.

BACKGROUND OF THE INVENTION

The present invention relates to a digital information signal recording apparatus and a digital information signal recording and reproducing apparatus, and in particular, to a digital information signal recording apparatus and a digital information signal recording and reproducing apparatus suitable for selecting and recording a plurality of video signals encoded into digital compression codes of different transmission rates and selecting and reproducing the recorded signals thereafter.

An example of a digital video tape recorder (VTR) in which a video signal is converted into a digital compression code for the recording and reproducing of the signal is described, for example, in two articles respectively in pages 588 to 596 and pages 597 to 605 of "IEEE Transactions on Consumer Electronics", Vol. 34, No. 3 (August 1988).

On the other hand, a digital broadcast is being put to practical use as a television (TV) broadcast of the next generation. For example, in the United States of America, there is known an advanced television (ATV) system in which a high-definition (HD) wide-band video signal having a resolution higher than that of a standard-definition (SD) video signal of the National Television System Committee (NTSC) system (525 lines/60 fields) or Phase Alteration Line (PAL) system (625 lines/50 fields) currently used is converted into a highly efficient digital compression code, thereby broadcasting the signal in the 6 megahertz (MHz) band-width presently used for TV broadcasting facilities. In addition, in association with the standard-definition system, there is known a system called "Direct TV" in which signals of a plurality of programs are converted into highly efficient digital compression codes respectively according to moving picture expert groups (MPEGs) such that the signals are transmitted via a satellite using time division multiplex communication.

In this situation, when these digital TV broadcasts are actually introduced to practical use, there are required digital VTRs corresponding thereto. However, in the prior art described above, consideration has not been given to technology for selecting and recording a plurality of digital TV signals of different transmission rates and selectively reproducing the signals thereafter.

An example of the apparatus in which a plurality of digital TV signals having different transmission rates are selectively recorded and reproduced is described in the U.S. Pat. No. 5,065,259 (corresponding to the JP-A-1-258255). This apparatus supports a plurality of recording modes such that information signals are encoded into digital data items of different transmission rates according to the recording modes. The encoded digital data items are then converted into signals of a fixed recording rate through a time-base or time-axis process. The obtained signals are recorded on a magnetic tape at a tape feed speed related to the transmission rates of the encoded digital data items, respectively.

However, in the apparatus of the U.S. Pat. No. 5,065,259, there has been missing technology associated with the automatic decisions of the recording modes in the signal reproduction process. Moreover, since an encoder is integrally included in the apparatus, consideration has not been given to the recording of such signals of digital data as digital video signals encoded in the MPEG system in which the transmission rate thereof varies with respect to time as well as for each of the programs, for example, programs of movies, sports, and news.

SUMMARY OF THE INVENTION

It is therefor an object of the present invention to provide a digital information recording apparatus and a digital information recording and reproducing apparatus for selecting and recording a plurality of digital video signals converted into digital compression codes having different transmission rates and selecting and reproducing the recorded signals, thereby solving the problem of the prior art.

To achieve the above object, a digital information recording and reproducing apparatus according to an aspect of the present invention comprises selecting means for selecting a signal to be recorded from a plurality of digital information signals having different transmission rates, identifier signal generator means for generating an identifier signal indicating contents of the selected signal, encoding means for conducting an interleaving process for the selected signal, forming blocks thereof by adding a synchronizing code, an identification code, an error correction code, and dummy data thereto, executing a time-base process and a modulation for the signal, thereby converting the signal into two channels of recording signals, recording and reproducing means including a first magnetic head and a second magnetic head respectively having azimuth angles respectively having opposing polarities and a third magnetic head and a fourth magnetic head opposing to the first and second magnetic heads with an angle of 180°, decoding means for conducting for a reproduction signal such decoding processes reverse to those of the encoding means as an equalizing process, a demodulating process, an error correcting process, and a deinterleaving process, thereby converting the reproduction signal into the original digital information signal, and servo means for controlling a rotation speed of a rotary drum and a feed speed of a magnetic tape.

When recording a first digital information signal in a range between a preset maximum transmission rate and one half thereof, the encoding means adds data such as dummy data thereto to convert the signal into two channels of recording signals having a fixed recording rate determined by the maximum transmission rate regardless of the input transmission rate, the servo means turns the rotary drum at a fixed rotation speed to feed the magnetic tape at a first feed speed, and the recording and reproducing means records and reproduces the two channels of recording signals on four tracks in one rotation of the rotary drum by alternately using the first and second magnetic heads and third and fourth magnetic heads.

On the other hand, when recording the second digital information signal in a range which is 1/N (N is an integer equal to or more than two) of that of the first digital information signal, the encoding means further compresses, each time the rotary drum makes N/2 rotations, the second digital information signal into a signal which is 1/N of the second digital information signal on a time axis, thereby converting the signal into two channels of recording signals respectively having the fixed recording rates, the servo means turns the rotary drum at the fixed rotary speed to feed the magnetic tape at a second feed speed equal to 1/N of the first feed speed, and the recording and reproducing means records and reproduces the two channels of recording signals on four tracks in one rotation of the rotary drum by using only the first and second magnetic heads or by alternately using the first and second magnetic heads and third and fourth magnetic heads. In this situation, the identifier signal indicating the contents of the recorded signal is also recorded as one of the identification (ID) codes together with the digital information signals.

The signals-reproduced by the first and second magnetic heads and/or the third and fourth magnetic heads are subjected in the decoding means to such processes reverse to those of the encoding means as equalization, demodulation, error correction, and deinterleaving so as to be converted into the original first or second digital information signal. In this operation, the decoding means detects the identifier signal thus recorded to control the time-axis process of its own and outputs to the servo means a reference signal to control the tape feed speed. On receiving the signal, the servo means sets the feed speed to the first or second speed employed in the signal recording operation.

Other objects, features, and advantages of the present invention will become apparent from the detailed description of the embodiments in conjunction with the accompanying drawings.

BRIEF DESCRIPTION OF THE DRAWINGS

FIG. 8 is a block diagram showing a configuration 1 example of a reproducing-system decoder according to the present invention;

FIGS. 9A to 9E are timing charts showing relationships between rotary periods of the drum and timings of record signals;

FIG. 17 is a block diagram showing still another embodiment of the digital information reproducing apparatus according to the present invention.

DESCRIPTION OF THE PREFERRED EMBODIMENTS

Next, description will be given of embodiments of the present invention by reference to the drawings.

Figure 1:
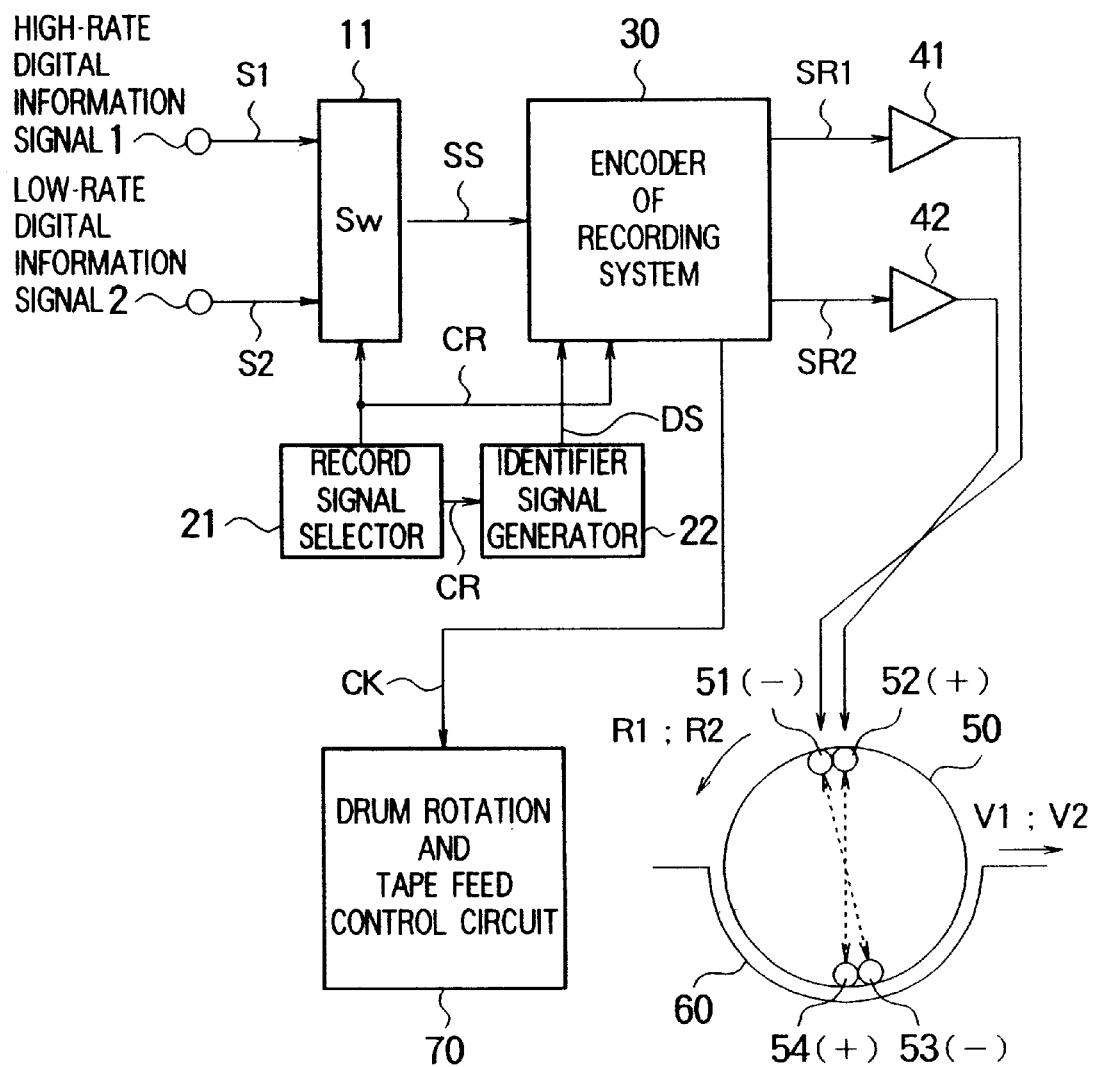
FIG. 1 is a block diagram showing an embodiment of the digital information recording apparatus according to the present invention.

FIG. 1 is a block diagram showing an embodiment of the digital information recording apparatus according to the present invention. In the diagram, reference numerals 1 and 2 indicate input terminals, numeral 11 denotes a change-over switch, numeral 21 stands for a recording signal selector, numeral 22 designates an identifier signal generator, numeral 30 indicates a recording-system encoder, numerals 41 and 42 denote record amplifiers, numeral 50 represents a rotary drum, numerals 51 to 54 designate magnetic heads, numeral 60 indicates a magnetic tape, and numeral 70 indicates a servo circuit. Incidentally, in association with the magnetic heads 51 to 54, the positive and negative signs (+) and (−) indicate positive and negative azimuths, respectively.

Operation of this embodiment will be next described.

In FIG. 1, to the input terminal 1, there is inputted a digital information signal S1 having a high transmission rate (of, for example, 20 megabits per second (Mbps) to 40 Mbps) such as a digital HDTV signal of the ATV system or a digital SDTV signal obtained by achieving time-division multiplex operation for a plurality of programs in the "Direct TV" system described above. On the other hand, supplied to the input terminal 2 is a digital information signal S2 having a low transmission rate (of, for example, 5 Mbps to 10 Mbps) such as a digital SDTV signal separated by selecting one of the plural programs in the "Direct TV" system. These signals S1 and S2 undergo selection by the change-over switch such that either one thereof is inputted as a record signal SS to the recording-system encoder 30.

The recording signal selector 21 selects as the record signal SS, the digital information signal Si of a high transmission rate or the digital information signal S2 of a low transmission rate to output a control signal CR therefrom. The identifier signal generator 22 receives the control signal CR to generate an identifier signal DS to identify whether the recorded signal is S1 or S2 and then supplies the signal DS to the recording system encoder 30.

Figure 2:
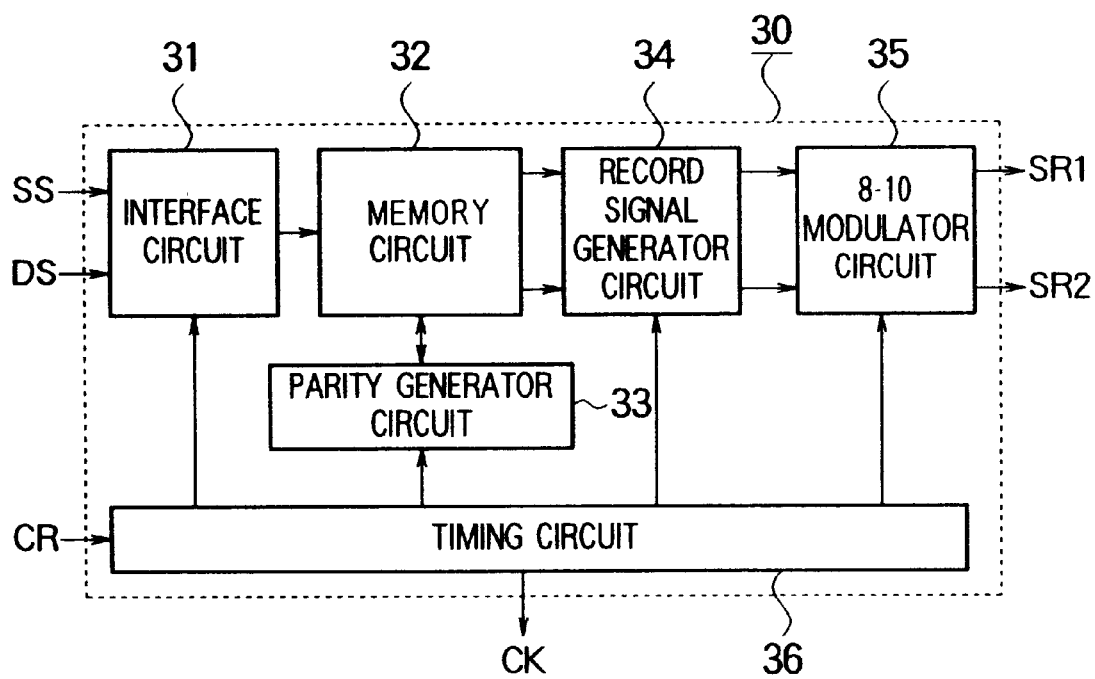
FIG. 2 is a block diagram showing an embodiment of a recording-system encoder according to the present invention.

FIG. 2 shows a block diagram showing a specific example of the recording-system encoder 30. In FIG. 2, a reference numeral 31 indicates an interface circuit, a numeral 32 denotes a memory circuit, a numeral 33 stands for a parity generator circuit, a numeral 34 represents a record signal generator circuit, a numeral 35 indicates an 8–10 modulator circuit, and a numeral 36 denotes a timing circuit.

Figure 3:
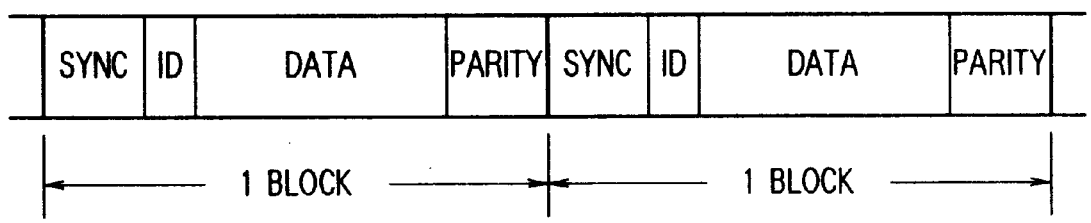
FIG. 3 is a diagram showing a configuration example of signals formatted by the recording-system encoder.

The inputted signal SS and identification signal DS are stored in the memory circuit 32 via the interface circuit 31. In the parity generator circuit 33, parity is generated from the data items SS and DS stored in the memory circuit 32 to be then accumulated in the memory circuit 32. The record signal generator circuit 34 reads the data and parity from the memory circuit 32, adds a synchronizing code and an identification (ID) code thereto, and then outputs therefrom two channels of signals in a block format shown in FIG. 3. In this step, an interleaving process is also carried out.

Figure 4:
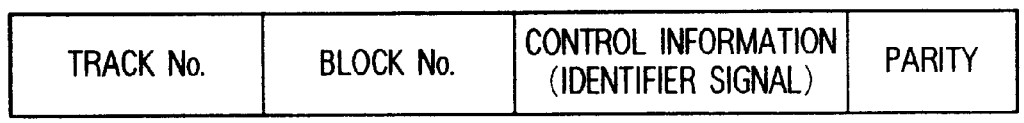
FIG. 4 is a diagram showing a configuration example of an identification (ID) code.

FIG. 4 shows a configuration example of the identification (ID) code, which includes such control information items as a track number to identify a record track, a block number to identify a position in the track, and a record time and a program number on a tape as well as parity to detect and correct errors therein. In this connection, the identifier signal DS is inserted into control information of the identification (ID) code.

The two channels of signals which are thus formatted through the interleaving operation, addition of the synchronizing code, identification (ID) code, and error correction code, and block forming operation are fed to the 8–10 demodulator circuit 35 to be subjected to a so-called 8–10 demodulation method in which the signals are classified into eight-bit groups. Each 8-bit group is converted into 10-bit data so as to limit the maximum run length, thereby attaining two channels of record signals SR1 and SR2. On receiving the control signal CR, the timing circuit 36 controls timings of the interface circuit 31, memory circuit 32, parity generator circuit 33, record signal generator circuit 34, and 8–10 modulator circuit 35 and then outputs a reference signal CK to the servo circuit 70.

The two channels of record signals SR1 and SR2 are then delivered respectively via the record amplifiers 41 and 42 to the magnetic heads 51 and 52 and magnetic heads 53 and 54, respectively. In this regard, the magnetic heads 51 and 52 and magnetic heads 53 and 54 are arranged over the rotary drum 50 at positions being close to each other and opposing to each other with an angle of 180° and with a predetermined gap therebetween (for example, on the same head bases).

In this situation, when the digital information signal S1 of a high transmission rate is to be recorded, the servo circuit 70 receives the reference signal CK from the timing circuit 36 to control the rotary drum 50 to rotate at a first rotation speed R1 and the magnetic tape 60 to be fed at a first feed speed V1 so as to conduct a 4-track azimuth recording operation in which the two channels of record signals SR1 and SR2 supplied via the record amplifiers 41 and 42 are recorded on four tracks in one rotation of the rotary drum 50 by alternately utilizing the magnetic heads 51 and 52 and magnetic heads 53 and 54.

Figure 5:
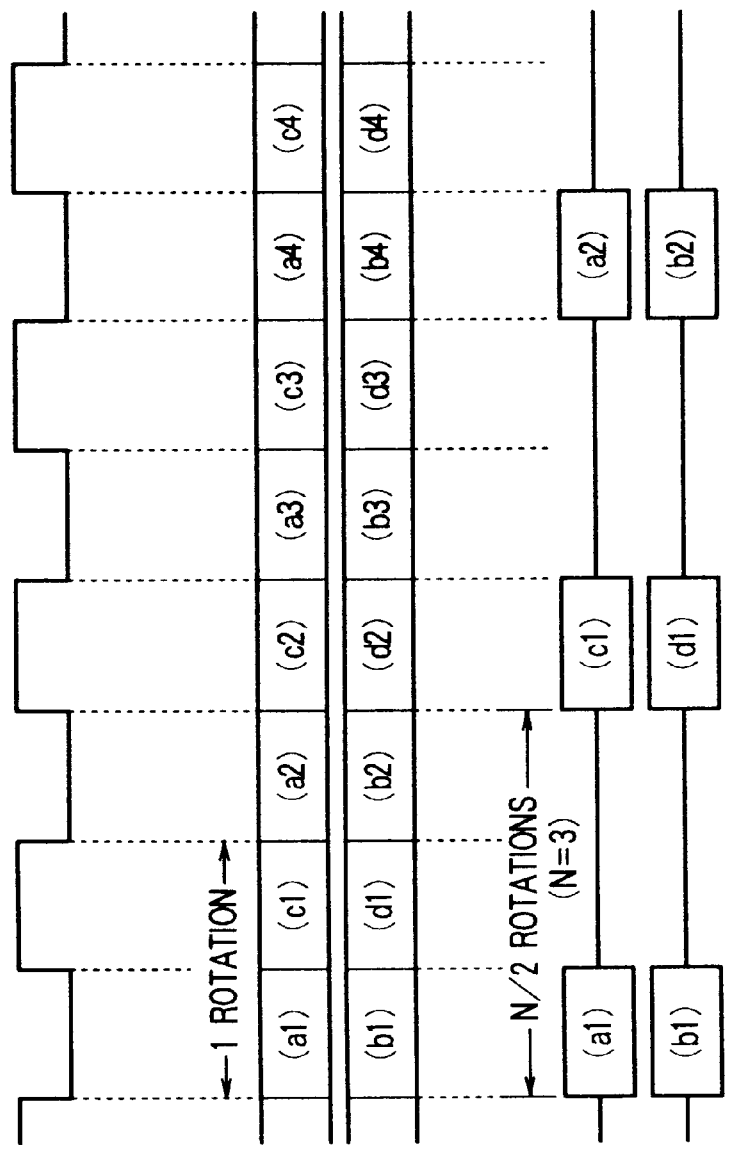
FIGS. 5A to 5E are timing charts showing relationships between rotary periods of the drum and timings of record signals in the embodiment of FIG. 1.

FIGS. 5A to 5E are timing charts showing relationships between rotations of the rotary drum 50 and timings of the record signals SR1 and SR2 in the operation above. In the diagram, FIG. 5A shows timing of the rotary drum 50 and FIGS. 5B and 5C show timings of the record signals SR1 and SR2, respectively.

In FIG. 5A, in the periods of a low level, data is recorded by the magnetic heads 51 and 52; whereas, in the periods of a high level, data is recorded by the magnetic heads 53 and 54. When recording the signal S1 of a high transmission rate, the record signals SR1 and SR2 are successively recorded as shown in FIGS. 5B and 5C.

Figure 6:
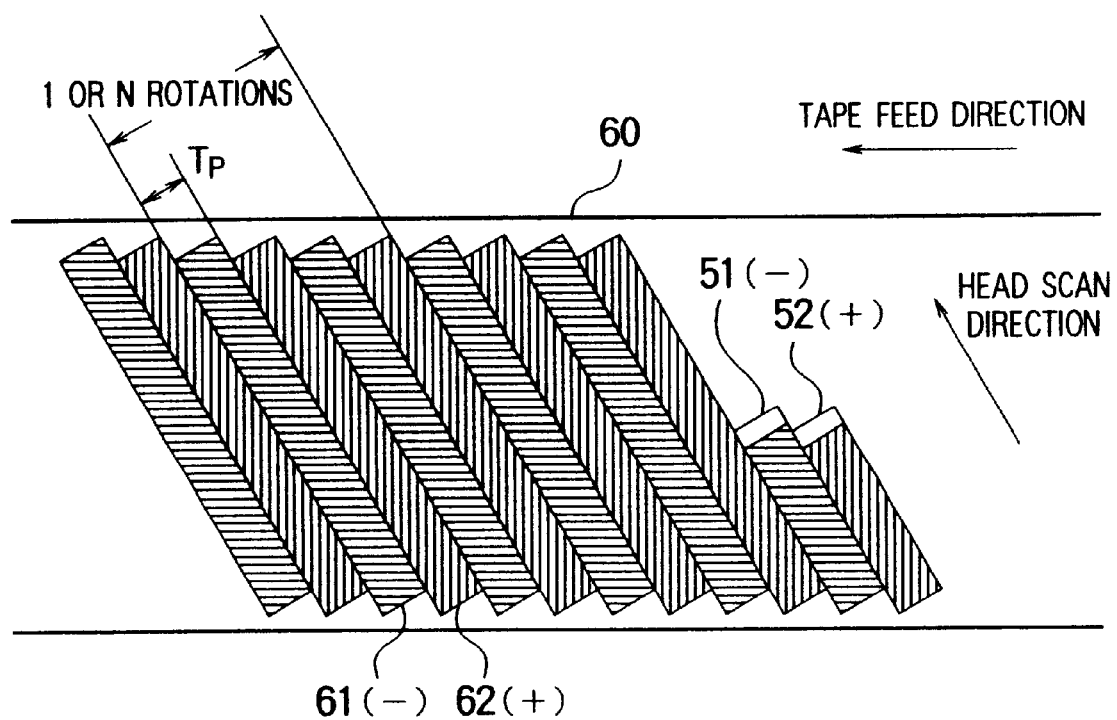
FIG. 6 is a diagram showing track patterns on a magnetic tape.

FIG. 6 shows track patterns drawn on the magnetic tape in the operation. As shown in FIG. 6, the record signals SR1 and SR2 are written respectively on a (−) azimuth track 61 and a (+) azimuth track 62 of the magnetic tape 60. In this regard, Tp indicates a track pitch.

On the other hand, when recording the signal S2 of a low transmission rate, there are outputted from the recording-system encoder 30, as shown in FIGS. 5D and 5E, two channels of burst-like recording signals SR1 and SR2 obtained by achieving a 1/N time-axis compression each time the rotary drum 50 makes N/2 rotations (N is an integer equal to or more than two). In this operation, when the ratio between the digital information signals S1 and S2 is assumed to be 1 to 1/n (n is a real number equal to or more than two), the time-axis compression ratio is set to an integer nearest to the transmission rate n. Furthermore, in case where N≠n, by adding dummy data to the signals, the recording rate of the burst-like record signals SR1 and SR2 can be set to be substantially equal to the recording rate employed when the digital information signal S1 is recorded.

On receiving the reference signal CK, the servo circuit 70 respectively controls the rotary drum 50 to rotate at a second rotation speed R2 (R2≈R1) almost equal to the first rotary speed R1 and the magnetic tape 60 to be fed at a second feed speed V2 (V2≈V/N) substantially equal to 1/N of the first feed speed V1. Thereafter, as shown in FIGS. 5D and 5E, the two channels of recording signals SR1 and SR2 formed in the burst-like format by the time-axis compression are written on the magnetic tape 60 by using only the magnetic heads 51 and 52 or by alternately using the magnetic heads 51 and 52 and the magnetic heads 53 and 54.

The burst-like record signals SR1 and SR2 are respectively recorded on (−) and (+) azimuth tracks 61 and 62 as described above, thereby achieving a 4-track azimuth recording operation in N rotations of the rotary drum 50. In consequence, track patterns are formed as shown in FIG. 6; namely, the record signals SR1 and SR2 are written respectively on (−) and (+) azimuth tracks 61 and 62 of the magnetic tape 60.

In this connection, although the time-base compression ratio N is set to three in FIGS. 5D and 5E for simplicity of explanation, the value N needs to only be set to an integer. That is, as shown in the diagram, when N takes an odd number, the magnetic heads 51 and 52 and magnetic heads 53 and 54 are alternately used; whereas, when N is an even number, there are used only the magnetic heads 51 and 52 to record the signals undergone the time-axis compression. Consequently, the 4-track azimuth recording operation in N rotations of the rotary drum 50 is not changed in any case. In consequence including the case of N=1, namely, the case of the digital information signal S1 of a high transmission rate, there can be used a common track format of signals on the magnetic tape 60. There exists a different point that the total period of time available for the recording of signals on the magnetic tape 60 is increased or decreased in accordance with the time-axis compression ratio N. Namely, for example, digital HD video signals of high quality or digital SD video signals of many programs can be recorded in a standard period of time. Moreover, if only one program of digital SD video signals is to be recorded, there can be conducted a long-period recording operation.

Figure 7:
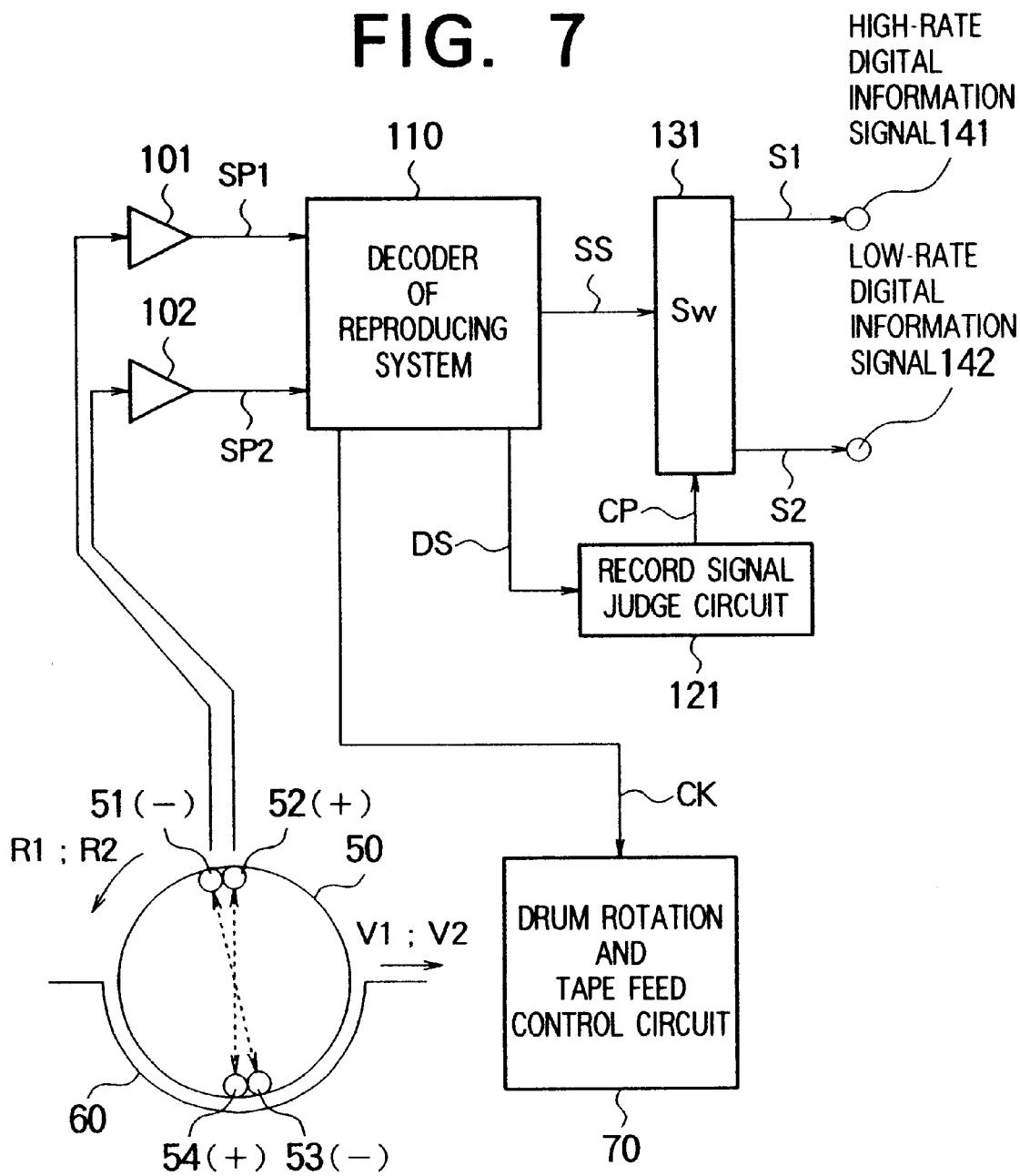
FIG. 7 is a block diagram showing an embodiment of the digital information reproducing apparatus according to the present invention.

FIG. 7 is a block diagram showing an embodiment of the digital information reproducing apparatus according to the present invention. In this diagram, reference numerals 101 and 102 indicate reproduction amplifiers, a numeral 110 denotes a reproducing-system decoder, a numeral 121 stands for a record signal judge unit, a numeral 131 represents a change-over switch, and numerals 141 and 142 indicate output terminals. Components corresponding to those of FIG. 1 are assigned with the same reference numerals.

Next, operation of the embodiment will be described.

In FIG. 7, two channels of signals SP1 and SP2 reproduced by the magnetic heads 51 and 52 and magnetic heads 53 and 54 and amplified by the reproduction amplifiers 101 and 102 are respectively supplied to the reproducing-system decoder 110.

In the decoder 110, the reproduction signals SP1 and SP2 are subjected to a de-formatting operation reverse to that of the recording-system encoder 30 to be transformed into the original digital information signals.

FIG. 8 is a block diagram showing a concrete example of the reproducing-system decoder 110. In FIG. 8, a reference numeral 111 indicates an 8–10 demodulator circuit, a numeral 112 designates a block reproducing circuit, a numeral 113 stands for a memory circuit, a numeral 114 represents an error correction circuit, a numeral 115 denotes a reproduction signal output circuit, and a numeral 116 indicates a timing circuit.

In the diagram, the reproduction signals SP1 and SP2 inputted thereto are fed to the 8–10 demodulator circuit 111 to undergo equalization, code discrimination, and demodulation to be fed to the block reproducing circuit 112. On the occasion, as the equalizing method of the 8–10 demodulator circuit 111, there may be employed, for example, an integral equalization (integral detection) in which differential characteristics of the reproducing system are compensated for by integration. In the block reproducing circuit 112, the synchronizing and identification (ID) codes are detected such that reproduced data is stored at a predetermined position in the memory circuit 113 according to a track number and a block number in the identifier signal.

The error correction circuit 114 corrects errors in the reproduced data in accordance with parity stored in the memory circuit 113. The reproduction signal output circuit 115 reads the corrected reproduction data from the memory circuit 113 to output therefrom the original digital information signal SS and identifier signal DS. In this operation, a deinterleaving process is performed in association with the interleaving process of the recording side. The timing circuit 116 controls timings of the 8–10 demodulator circuit 111, block reproducing circuit 112, error correction circuit 114, and reproduction signal output circuit 115 and outputs the reference signal CK to the servo circuit 70.

In this situation, the record signal judge circuit 121 receives the identifier signal DS from the reproducing-system decoder 110 to decide whether the record reproduction signal is the digital information S1 or S2 to output a control signal CP so as to control the change-over switch 131 in accordance with the signal CP. Thereafter, when the record reproduction signal is decided to be the digital information signal S1 of a high transmission rate or the digital information signal S2 of a low transmission rate, the digital information signal SS is outputted from the output terminal 141 or 142, respectively.

In addition, on receiving the reference signal CK, the servo circuit 70 controls the rotary drum 50 to rotate at a first or second rotary speed R1 or R2 and the magnetic tape 60 to be fed at a first or second feed speed V1 or V2, respectively.

Incidentally, at the initial point of reproduction, the identifier signal is not detected and control of the rotary drum 50 and magnetic tape is undetermined. In this case, for example, control is effected to set the rotation speed of the rotary drum 50 and the feed speed of the magnetic tape 60 respectively to the first rotation speed R1 and first feed speed V1 such that the speed control need only be altered when the identifier signal is detected. This is because the recording rates are substantially equal to each other and the track format is commonly used and hence even when a tape on which digital information signals of a low transmission rate are recorded is reproduced in the above manner, the reproducing-system decoder 110 conducts a normal operation to appropriately detect the identifier signal.

As above, according to the embodiment, two kinds of digital information signals having different transmission rates, for example, HDTV signals encoded through digital compression and SDTV signals similarly encoded through digital compression or SDTV signals of a plurality of programs encoded through digital compression and undergone time-division multiplexing operation and digital SDTV signals of a program selected and separated from the plural programs can be selected and recorded on a medium so as to be automatically judged for reproduction thereof by the single-head configuration.

Incidentally, in conjunction with the embodiment, there has been described a method of inserting the identifier signal into record data. However, the present invention is not restricted by the embodiment. Namely, the identifier signal may be recorded a plurality of times on a control track prepared to control tracking.

Additionally, in the example of the embodiment, the effective wrap angle of the magnetic tape 60 on the rotary drum is 180°, which does not restrict the present invention. For example, the present invention is also applicable to a case of the effective angle less than 180°.

FIGS. 9A to 9E are timing charts showing relationships between rotations of the rotary drum 50 and timings of the record signals SR1 and SR2 in the situation. Like FIGS. SA to 5E, FIG. 9A shows timings of the rotary drum 50, FIGS. B and C presents timings of the record signals SR1 and SR2 when recording the digital information signal S1 of a high transmission rate, and FIGS. D and E show timings of the record signals SR1 and SR2 when recording the digital information signal S2 of a low transmission rate.

In case where the signal S1 is to be recorded, the record signals SR1 and SR2 which are undergone a time-base compression at an effective wrap angle el (e.g., 90° to 175°) each time the rotary drum 50 makes a half rotation are outputted from the recording-system encoder 30 to be recorded as shown in FIGS. 9B and 9C. On the other hand, when the signal S2 is to be recorded, the record signals SR1 and SR2 which are compressed through a time-base compression to 1/N of the original signals each time the rotary drum 50 makes N/2 rotations and undergone a time-base compression at an effective angle $\zeta 2$ ($\theta 2 \approx \theta 1$) are outputted from the recording-system encoder 30 to be recorded as shown in FIGS. 9D and 9E.

Moreover, although the 8–10 modulation method is employed as a method of modulating record data in the embodiment, the present invention is not restricted by the method. Namely, there may be adopted an interleaved scrambled non-return-to-zero inverse (I-S-NRZI) modulation method.

Figure 10:
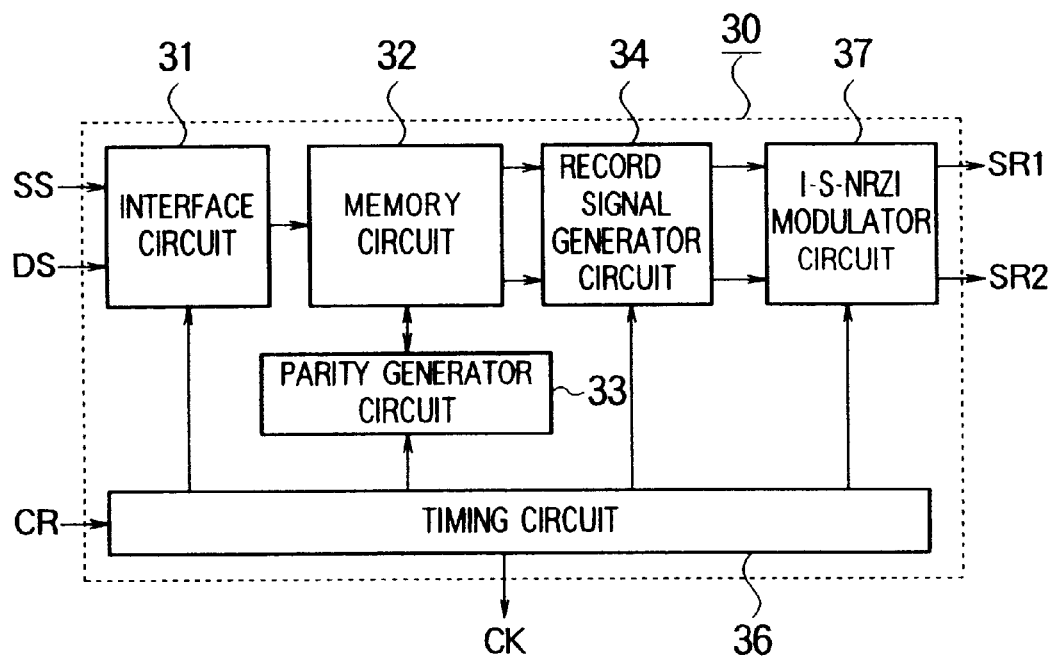
FIG. 10 is a block diagram showing another configuration example of the recording-system encoder according to the present invention.

FIG. 10 is a block diagram showing another specific embodiment of the recording-system encoder according to the present invention. In FIG. 10, a reference numeral 37 indicates an I-S-NRZI modulator circuit and components corresponding to those of FIG. 2 are assigned with the same reference numerals. Adoption of the I-S-NRZI modulation method is a feature of the specific example.

In the I-S-NRZI modulation method, record data is first randomized by pseudo random signals such that the randomized record data is Ex-ORed with a demodulation signal having a delay of two bits. When compared with the 8–10 modulation method, this method has an aspect that the final recording rate is reduced to 8/10 of the original recording rate. On the other hand, according to the I-S-NRZI modulation method, although there can be recorded signals containing a spectrum up to a low frequency zone, the spectrum of the low frequency zone cannot be reproduced due to differential characteristics of the reproducing system. When the signals are equalized in the integral equalization method, there arises a problem of deterioration of the signal-to-noise (S/N) ratio. In this situation, when using the I-S-NRZI modulation method, it is necessary for the reproducing system to utilize the an equalization (detection) method not using integration.

Figure 11:
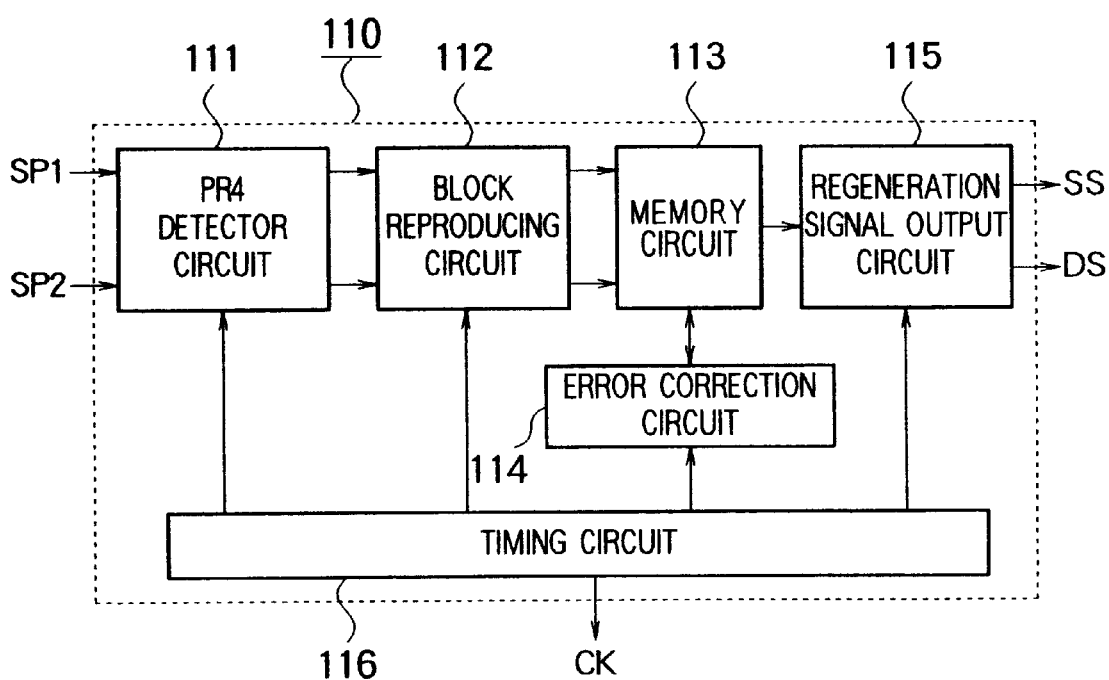
FIG. 11 is a block diagram showing another configuration example of the reproducing-system decoder according to the present invention.

FIG. 11 is a block diagram showing another concrete example of the reproducing-system decoder 110 according to the present invention corresponding to the recording-system encoder 30 shown in FIG. 10. In FIG. 11, a reference numeral 111 indicates a partial response class IV (PR4) detector circuit and the components corresponding to those of FIG. 8 are assigned with the same reference numeral.

In the diagram, the PR4 detector circuit 117 detects randomized record data in the regenerated signals and then de-scrambles the randomized record data. To detect the data, there is naturally used the PR4 detection method. In this method, the overall impulse response of the recording and reproducing systems is represented as (1, 0, −1). Since integration is unnecessary, there is advantageously attained a feature of a satisfactory S/N ratio.

Figure 12:
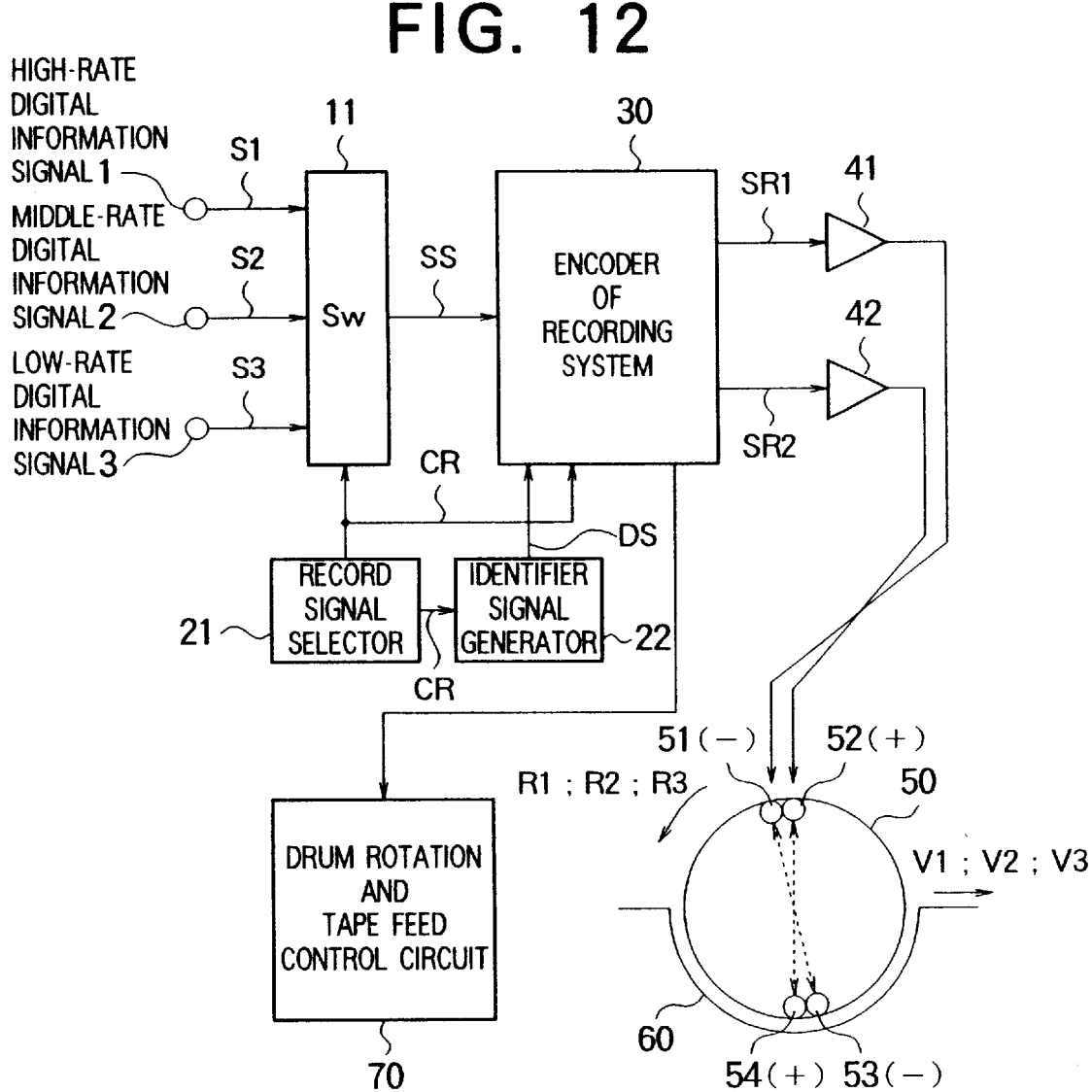
FIG. 12 is a block diagram showing still another embodiment of the digital information recording apparatus according to the present invention.

FIG. 12 is a block diagram showing still another embodiment of the digital information recording apparatus according to the present invention. In FIG. 12, a reference numeral 3 denotes an input terminal and components corresponding to those of FIG. 1 are assigned with the same reference numerals.

The embodiment has a feature that three kinds of digital information signals respectively having high, middle, and low transmission rates are selectively recorded. Operation of the embodiment will now be described.

In the diagram, in a similar manner as for the embodiment shown in FIG. 1, a digital information signal S1 of a high transmission rate (e.g., 20 Mbps to 40 Mbps) and a digital information signal S2 of a middle trans-mission rate (e.g., 5 Mbps to 10 Mbps) are supplied to the input terminals 1 and 2, respectively. Moreover, a digital information signal S3 of a low transmission rate (e.g., 1 Mbps to 2 Mbps) of a digital SDTV signal encoded by a further efficient digital compression is fed to the input terminal 3. These signals S1, S2, and S3 are then subjected to selection or changed-over by the change-over switch 11 such that either one thereof is inputted as a record signal SS to the recording-system encoder 30.

The record signal selector 21 selects as the record signal SS the signal S1 of a high transmission rate, the signal S2 of a middle transmission rate, or the signal S3 of a low transmission rate and then outputs the control signal CR. On receiving the control signal CR, the identifier signal generator 22 generates an identifier signal DS to identify whether the recorded signal is S1, S2, or S3 to supply the signal DS to the recording-system encoder 30.

In the encoder 30, there are conducted processes similar to those of the embodiment shown in FIGS. 1 and 2. Namely, in accordance with the respective signals, the signals are converted into two channels of recording signals SR1 and SR2 at timings shown in FIGS. 13A to 13G.

Figure 13:
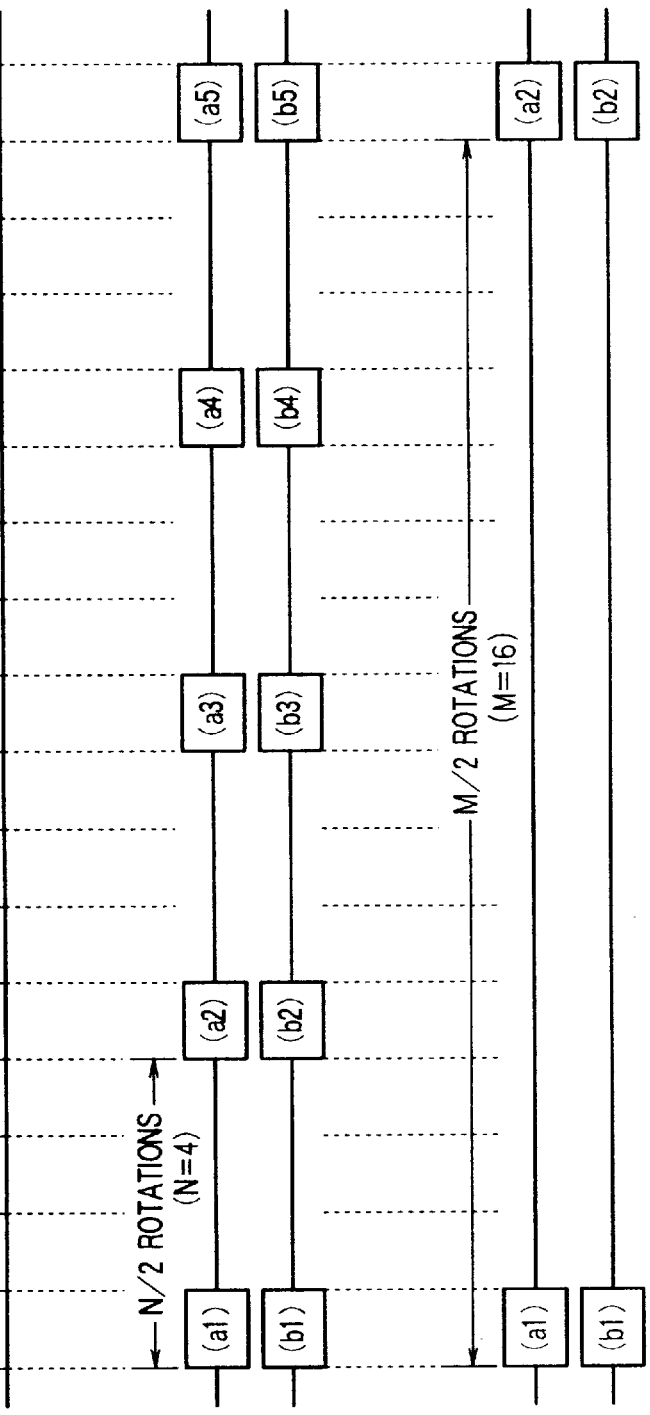
FIGS. 13A to 13G are timing charts showing relationships between rotary periods of the drum and timings of record signals in the embodiment of FIG. 12.

In this connection, FIG. 13A shows rotation timing of the rotary drum 50, FIGS. 13B and 13C respectively show timings of the record signals SR1 and SR2 when the signal S1 is recorded, FIGS. 13D and 13E respectively show timings of the record signals SR1 and SR2 when the signal S2 is recorded, and FIGS. 13F and 13G respectively show timings of the record signals SR1 and SR2 when the signal S3 is recorded.

In FIG. 13A, the recording is conducted by the magnetic heads 51 and 52 and magnetic heads 53 and 54 respectively during the low-level and high-level periods in a manner similar to that of the embodiment shown in FIG. 1. Moreover, when recording the signal S1 of a high-transmission rate, record signals SR1 and SR2 are consecutively outputted from the recording-system encoder 30 as shown in FIGS. 13B and 13C.

On the other hand, when the signal S2 of a middle-transmission rate is to be recorded, two channels of burst-like recording signals SR1 and SR2 which are compressed on a time axis to 1/N of the original signal each time the rotary drum makes N/2 rotations (N is an integer equal to or more than two) are delivered from the recording-system encoder 30 as shown in FIGS. 13D and 13E. On this occasion, when the ratio between the transmissions respectively of the signals Si and S2 is assumed as 1:1/n (n is a real number equal to or more than two), the time-base compression ratio N is set to an integer nearest to the rate n. Moreover, in case where N≈n, for example, by adding dummy data to the signals, the recording rate of the burst-like record signals SR1 and SR2 is set to be substantially equal to the recording rate at which the signal S1 of a high transmission rate is recorded.

Similarly, when recording the signal S3 of a low-transmission rate, two kinds of burst-like record signals SR1 and SR2 which are compressed on a time axis to 1/M of the original signals each time the rotary drum makes M/2 rotations (M is an integer equal to or more than two) are delivered from the recording-system encoder 30 as shown in FIGS. 13F and 13G. In this situation, when the ratio between the transmissions respectively of the signals S1 and S3 is assumed as 1:1/m (m is a real number equal to or more than two), the time-base As compression ratio M is set to an integer nearest to the rate m. Furthermore, in case where M≈m, for example, by adding dummy data to the signals, the recording rate of the burst-like record signals SR1 and SR2 is set to be almost equal to the recording rate employed to record the signal S1 of a high transmission rate.

These two channels of recording signals SR1 and SR2 are then supplied respectively via the record amplifiers 41 and 42 to the magnetic heads 51 and 52 and magnetic heads 53 and 54, respectively.

When the signal S1 is to be recorded, the servo circuit 70 receives the reference signal CK from the recording-system encoder 30 to achieve a control operation to set the rotation speed of the rotary drum 50 and the feed speed of the magnetic tape 60 respectively to a first rotation speed R1 and a first feed speed V1 so as to accomplish four-track azimuth recording of the record signals SR1 and SR2 shown in FIGS. 13B and 13C for each revolution of the rotary drum 50 by alternately using the magnetic heads 51 and 52 and magnetic heads 53 and 54.

On the other hand, when recording the signal S2, the servo circuit 70 receives the reference signal CK from the encoder 30 to control the rotation speed of the rotary drum 50 and the feed speed of the magnetic tape 60 to be set respectively to a second rotation speed R2 similar to the first rotation speed R1 (R2≈R1) and a second feed speed V2 similar to 1/N of the first feed speed V1 (V2≈V1/N). Thereafter, the servo circuit 70 conducts four-track azimuth recording of the record signals SR1 and SR2 shown in FIGS. 13D and 13E in every N turns of the rotary, drum 50 by use of the magnetic heads 51 and 52.

In the similar manner, when recording the signal S3, the servo circuit 70 receives the reference signal CK from the encoder 30 to control the rotation speed of the rotary drum 50 and the feed speed of the magnetic tape 60 to be set respectively to a third rotation speed R2 similar to the first rotation speed R1 (R3≈R1) and a third feed speed V3 similar to 1/M of the first feed speed V1 (V3≈V1/M). The servo circuit 70 then conducts four-track azimuth recording of the record signals SR1 and SR2 shown in FIGS. 13F and 13G by the magnetic heads 51 and 52 each time the rotary drum 50 makes M rotations.

As above, the record signals SR1 and SR2 are recorded respectively on the minus (−) and plus (+) azimuth tracks 61 and 62 in a similar manner as for the track patterns shown in FIG. 6. This makes it possible to use the common track format on the magnetic tape.

Figure 14:
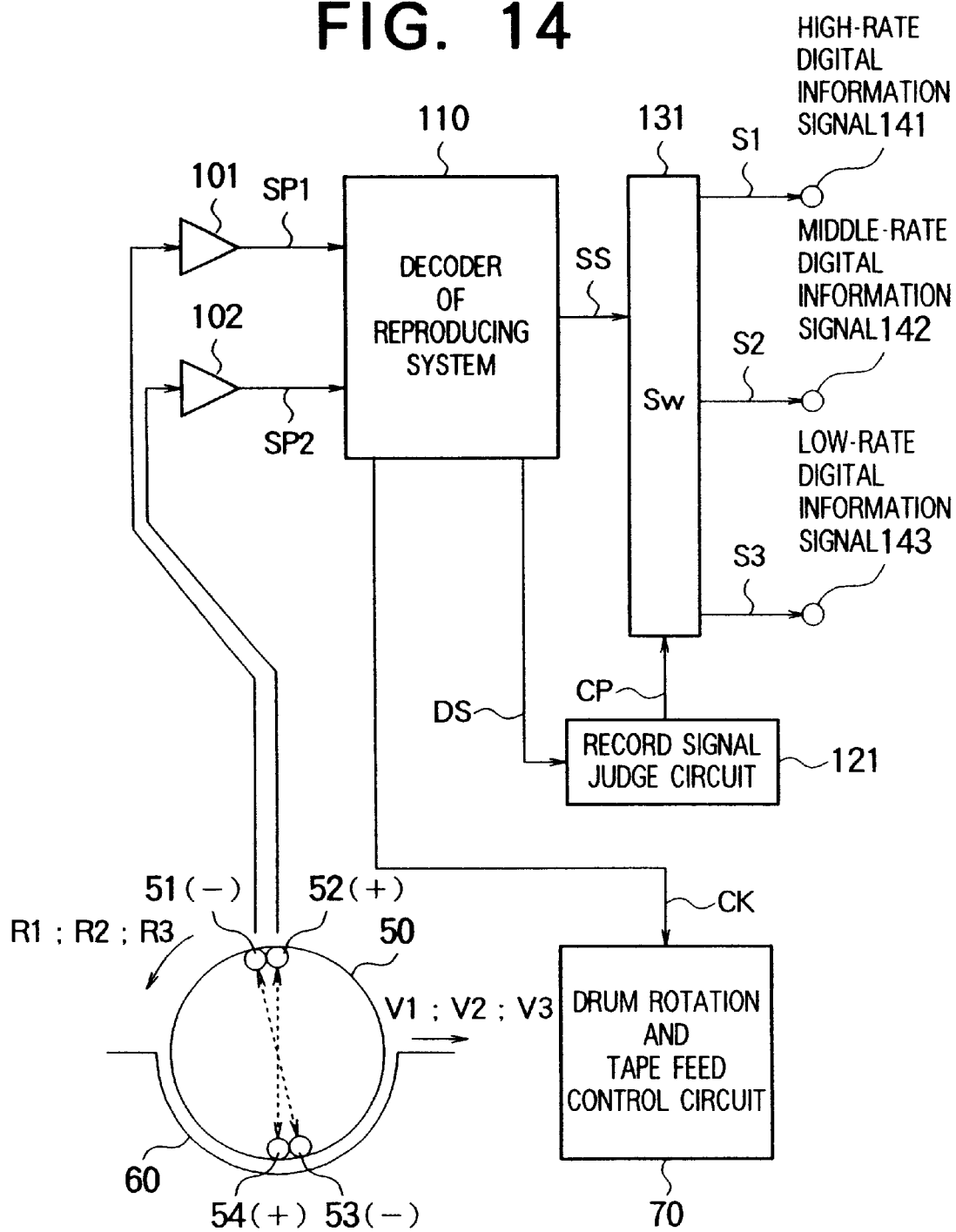
FIG. 14 is a block diagram showing still another embodiment of the digital information reproducing apparatus according to the present invention.

FIG. 14 is a block diagram showing further another embodiment of the digital information reproducing apparatus according to the present invention. In this diagram, a reference numeral 143 indicates an output terminal and components corresponding to those of FIG. 7 are assigned with the same reference numerals.

The embodiment has a feature that three kinds of digital information signals having high, middle, and low transmission rates selected and recorded in association with the recording apparatus shown in FIG. 12 are automatically judged for reproduction thereof.

Next, description will be given of operation of the embodiment.

In FIG. 14, two channels of signals SP1 and SP2 reproduced by the magnetic heads 51 and 52 and magnetic heads 53 and 54 and amplified by the reproduction amplifiers 101 and 102 are respectively supplied to the reproducing-system decoder 110 to undergo a decoding process of the reproducing system in a similar fashion as for the embodiment shown in FIG. 7 so as to restore the original digital information signal SS and control information DS. Similarly, the record signal judge circuit 121 receives the identifier signal DS to decide whether the record reproduction signal is the digital information S1, S2, or S3 and accordingly controls the change-over switch 131. In addition, on receiving the reference signal CK from the decoder 110, the servo circuit 70 respectively controls the rotary drum 50 to set the rotary speed to a first, second, or third rotation speed R1, R2, or R3 and the feed speed of the magnetic tape 60 to a first, second, or third feed speed V1, V2, or V3, respectively.

Thereafter, when the digital information signal SS is the signal S1, S2, or S3, the signal is outputted respectively from the output terminal 141, 142, or 143 via the change-over switch 131.

As above, according to the embodiments shown in FIGS. 12 and 14, three kinds of digital information signals having different transmission rates can be selected and recorded to be thereafter automatically judged for reproduction thereof by the single-head configuration.

Incidentally, in the embodiments above, the transmission, recording, and reproducing speeds of digital information are fixed. However, the present invention is not restricted by the embodiments. For example, the present invention is applicable to a system in which the transmission, recording, and reproducing speeds of digital information are increased (more specifically, digital information is compressed on a time axis for transmission and recording thereof). In the signal reproduction, there is reproduced information having the original transmission rate (through expansion thereof on a time axis).

Figure 15:
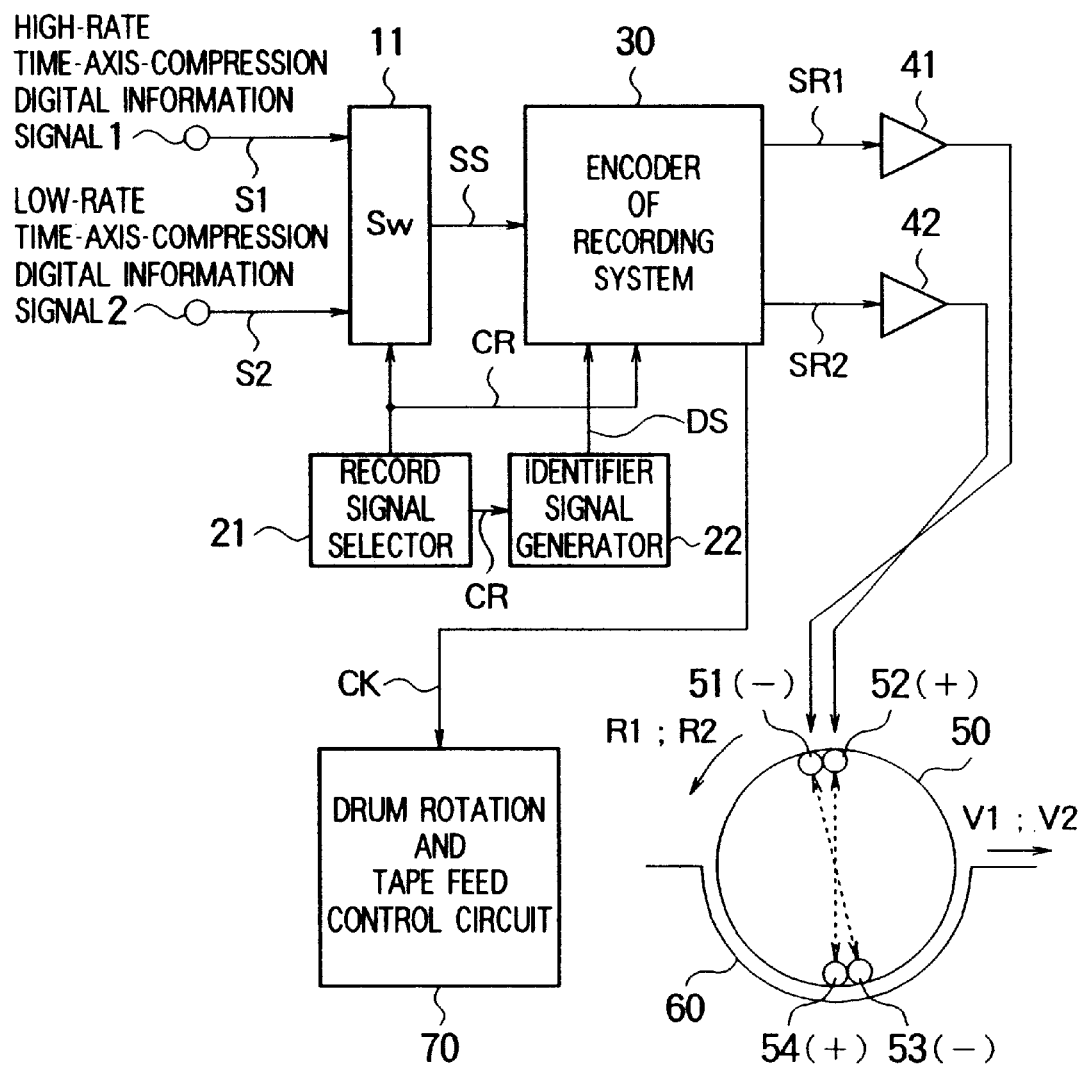
FIG. 15 is a block diagram showing still another embodiment of the digital information recording apparatus according to the present invention.

FIG. 15 is a block diagram showing still another embodiment of the digital information recording apparatus according to the present invention in association with the system above.

In the diagram, a digital information signal S1 of a high transmission rate compressed on a time axis to 1/K (K is an integer equal to or more than two) of the original signal and a digital information signal S2 of a low transmission rate compressed on a time axis to 1/L (L is an integer equal to or more than two) of the original signal are inputted to the input terminals 1 and 2, respectively. Thereafter, the recording of the signals is accomplished in the same manner as for the embodiment shown in FIG. 1. In this situation, it is to be appreciated that control information denoting that the record signal is a signal undergone a time-base compression is inserted in the identifier signal from the identifier signal generator 22.

Figure 16:
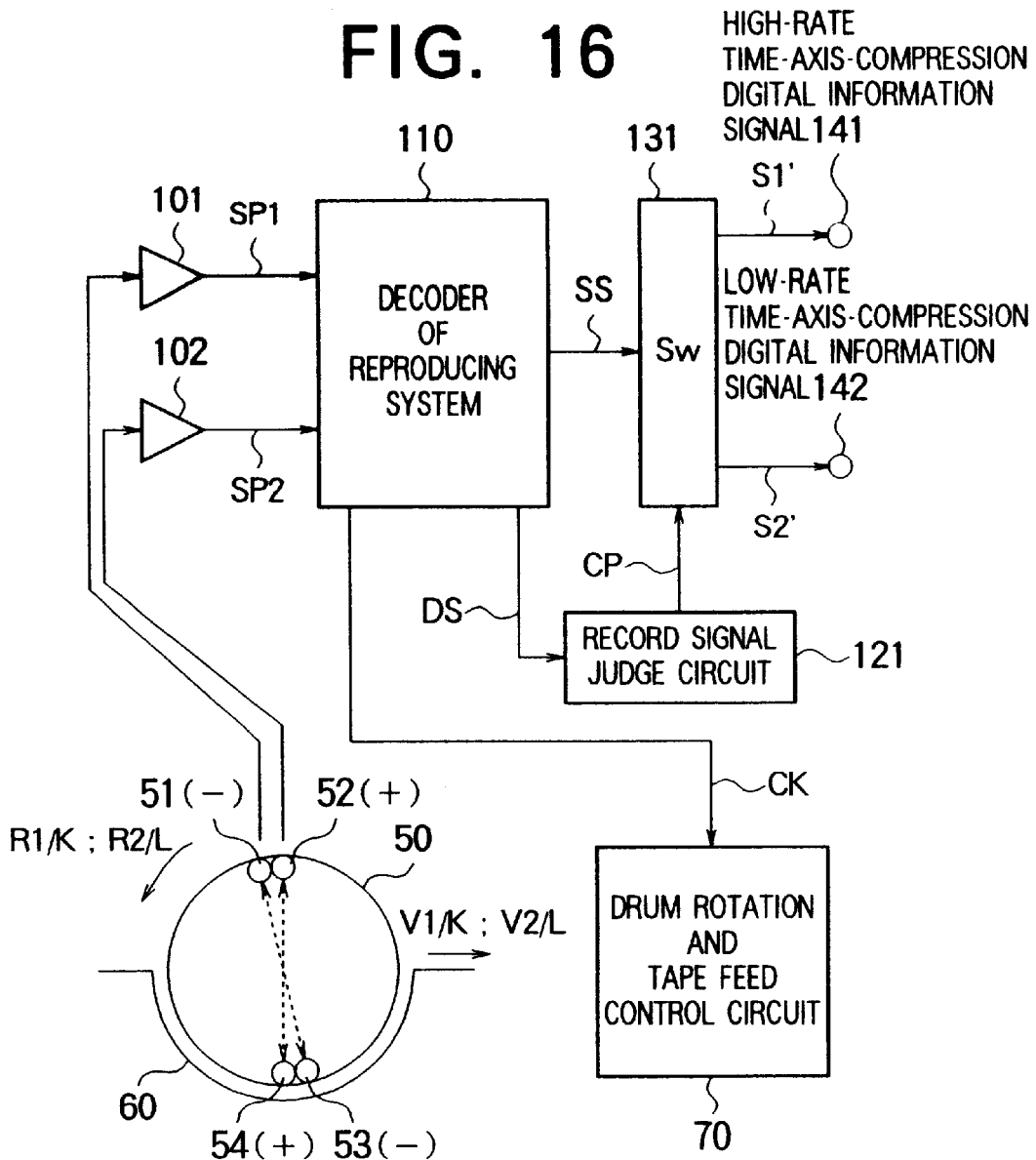
FIG. 16 is a block diagram showing further another embodiment of the digital information reproducing apparatus according to the present invention.

FIG. 16 is a block diagram showing still another embodiment of the digital information reproducing apparatus according to the present invention in association with the system above.

In the diagram, on receiving the reference signal CK from the decoder 110 the servo circuit 70 achieves control operations in the similar manner as for the embodiment shown in FIG. 7. When reproducing the signal S1 undergone the 1/K time-axis compression, the servo circuit 70 controls the rotary drum 50 to rotate at a rotation speed (R1/K) equal to 1/K of the recording rotation speed and the feed speed of the magnetic tape 60 to be set to a feed speed (V1/K) equal to 1/K of the recording feed speed. on the other hand, when reproducing the signal S2 undergone the 1/L time-axis compression, the servo circuit 70 controls the rotary drum 50 to respectively set the rotation speed to a rotary speed (R2/L) equal to 1/L of the recording rotation speed and the feed speed of the magnetic tape 60 to a feed speed (V2/L) equal to 1/L of the recording feed speed.

In the reproducing operation, when each of the rotation speed of the rotary drum 50 and the feed speed of the magnetic tape 60 is set operation to 1/K or 1/L of the associated speed used in the recording operation, the magnetic heads 51 and 52 and magnetic heads 53 and 54 draw the same scanning tracks as those of the recording operation and hence there are reproduced signals multiplied by K or L on a time axis. The other operations are the same as those of the embodiment shown in FIG. 7. Outputted respectively from the output terminals 141 and 142 are a digital information signal S1' of a high transmission rate having the original speed (multiplied by K on a time axis) and a digital information signal S2' of a low transmission rate having the original speed (multiplied by L on a time axis).

As above, according to the embodiment, in a system in which two kinds of digital information signals having different transfer rates are selected and recorded to be thereafter automatically reproduced by the single-head configuration, the recording period of time can be reduced.

FIG. 17 is a block diagram showing further another embodiment of the digital information reproducing apparatus according to the present invention in association with a system in which the recording time is minimized in the same fashion as for the embodiment shown in FIG. 16.

This embodiment differs from that shown in FIG. 16 in that the servo circuit 70 of FIG. 17 controls the rotary drum 50 to set the rotation speed to the first or second rotation speed R1 or R2 used in the recording operation. When the rotation speed of the rotary drum 50 is set to 1/K or 1/L, the frequency band of reproduced signals is lowered to 1/K or 1/L of that obtained in the recording operation and hence the reproduction output level is decreased. In this situation, if the S/N ratio is sufficient, there will not arise any problem. However, when the value of K or L is increased, the S/N ratio may possibly become insufficient.

To cope with the difficulty in the reproduction, according to the embodiment, the rotary speed of the rotary drum 50 is set to that of the recording operation to enlarge the frequency band of reproduced signals, thereby guaranteeing the reproduction output level.

Incidentally, the scanning tracks of the magnetic heads 5-1 and 52 and magnetic heads 53 and 54 in the reproduction are different from those of the recording operation in this embodiment. However, since each track is scanned substantially K or L times, it is possible to obtain a sequence of signals through the scanning operations.

That is, in the reproducing-system decoder 110 shown in FIG. 8 or 11, the reproduction signals SP1 and SP2 inputted thereto are subjected to processes of equalization, code discrimination, and demodulation in the 8–10 demodulator circuit 111 and/or the PR4 detector circuit 111 to be then supplied to the block regenerating circuit 112. In the circuit 112, a synchronizing code and an identification (ID) code are detected such that reproduction data is stored at a predetermined position of the storage circuit 113 according to a track number and a block number in the identification (ID) code.

In the error detection circuit 114, errors contained in the reproduction data are corrected in accordance with parity stored in the storage circuit 113 and there is generated a pointer indicating the error state, thereby storing the pointer in the memory circuit 113. In this operation, although data having the same track and block numbers is inputted L times to the storage circuit 113, data containing the smallest number of errors is finally stored therein in accordance with the pointer. In the reproduction signal output circuit 115, reproduction data undergone the error correction and stored in the memory circuit 113 are sequentially read therefrom in a sequence of the track and block numbers.

As above, there are reproduced the original digital information signals SS expanded in accordance with the original speed on a time axis. In the scanning operation above, the reproduction output level can be guaranteed. Moreover, the track is scanned K or L times, which leads to an advantage that any precise tracking control operation is not required.

In conjunction with the embodiment above, description has been given of a case in which two or three kinds of digital information signals having different transmission rates are recorded and reproduced. However, the present invention is not restricted by the embodiment. It is to be appreciated that digital information signals of an arbitrary number of kinds can be selected and recorded to be thereafter automatically judged for reproduction thereof by the single-head configuration.

As described above, according to the present invention, a plurality of digital information signals having different transmission rates can be selected and recorded to the thereafter automatically judged for reproduction thereof by the single-head configuration.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital information recording apparatus having a first recording mode recording a first digital information signal of a first information rate on a magnetic tape to be fed at a first feed speed and a second recording mode recording a second digital information signal of a second information rate of 1/n times said first information rate (where n is a real number of not less than 2) on the magnetic tape to be fed at a second feed speed of 1/N times said first feed speed (where N is an integer of not less than 2), comprising:

a circuit which when said second information rate is less than 1/N times said first information rate, adds a dummy signal to said second digital information signal to make the recording rate of said second digital information signal substantially equal to the recording rate of said first digital information signal; and a circuit which multiplexes an identification signal for identifying whether said digital information signal is said first or said second digital information signal or for identifying whether said recording mode is said first or said second recording mode, on said first or said second digital information signal, for recording.

2. A digital information recording apparatus according to claim 1, comprising:

a circuit for said first recording mode which records said first digital recording signal to four tracks on said magnetic tape per one revolution of a rotary drum with magnetic heads thereon; and a circuit for said second recording mode which records said second digital information signal to four tracks on said magnetic tape per N revolutions of said rotary drum.

3. A digital information recording apparatus comprising:

an encoder which encodes a selected one of digital information signals having a plurality of different information rates into a predetermined recording signal;

a recorder which records said recording signal to a helical track on a magnetic tape using a magnetic head mounted on a rotary drum;

a servo circuit which rotates said rotary drum at a predetermined speed and causes movement of said magnetic tape at a predetermined feed speed or 1/N times the predetermined feed speed(where N is an integer of not less than 2) in accordance with said information rate of said digital information signal to be recorded;

wherein said encoder comprises:

a circuit which when the information rate of said digital information signal to be recorded on said magnetic tape to be fed at 1/N times said predetermined feed speed is less than 1/N times an information rate of said digital information signal to be recorded on the magnetic tape to be fed at a predetermined speed, adds a dummy signal to said digital information signal to be recorded on said magnetic tape to be fed at 1/N times said predetermined speed to provide a recording signal having the predetermined recording rate; and a circuit which multiplexes an identification signal for identifying said selected digital information signal having a different information rate or said feed speed of the magnetic tape on said digital information signal to be recorded, for encoding.

4. A digital information recording apparatus according to claim 3, wherein said recorder comprises:

a circuit which records, said digital information signal to be recorded on said magnetic tape fed at said predetermined feed speed, to four tracks on said magnetic tape per one revolution of a rotary drum; and a circuit which records, said digital information signal to be recorded on said magnetic tape to be fed at 1/N times said predetermined feed speed, to four tracks on said magnetic tape per N revolutions of said rotary drum.

5. A digital information recording and reproducing apparatus having a first recording and reproducing mode recording and reproducing a first digital information signal of a first information rate on a magnetic tape to be fed at a first feed speed and a second recording and reproducing mode recording and reproducing a second digital information signal of a second information rate of 1/n times said first information rate (where n is a real number of not less than 2) on the magnetic tape to be fed at a second feed speed of 1/N times said first feed speed (where N is an integer of not less than 2), comprising:

- a circuit for recording which when said second information rate is less than 1/N times said first information rate, adds a dummy signal to said second digital information signal to make the recording rate of said second digital information signal substantially equal to the recording rate of said first digital information signal; and
- a circuit which multiplexes an identification signal for identifying whether said digital information signal is said first or said second digital information signal or for identifying whether said recording mode is said first or said second recording mode, on said first or said second digital information signal for recording; and
- a circuit for reproduction which detects the multiplexed identification signal to identify an original of said first or second digital information signal based on the detection result.

6. A digital information recording and reproducing apparatus according to claim 5, comprising:

- a circuit for said first recording and reproducing mode which records and reproduces said first digital recording signal to four tracks on said magnetic tape per one revolution of a rotary drum with magnetic heads thereon; and
- a circuit for said second recording and reproducing mode which records and reproduces said second digital information signal to four tracks on said magnetic tape per-N-revolutions of said rotary drum.

7. A digital information recording and reproducing apparatus comprising:

- an encoder which encodes a selected one of digital information signals having a plurality of different information rates into a predetermined recording signal;
- a recorder and reproducer which records and reproduces said recording signal to a helical track on a magnetic tape using a magnetic head mounted on a rotary drum;
- a decoder which decodes an original digital information signal from a signal reproduced from said tape;
- a servo circuit which rotates said rotary drum at a predetermined speed and causes movement of said magnetic tape at a predetermined feed speed or 1/N times the predetermined feed speed(where N is an integer of not less than 2) in accordance with said information rate of said digital information signal to be recorded;

wherein said encoder comprises:

- a circuit which when the information rate of said digital information signal to be recorded on said magnetic tape to be fed at 1/N times said predetermined feed speed is less than 1/N times an information rate of said digital information signal to be recorded on the magnetic tape to be fed at a predetermined speed, adds a dummy signal to said digital information signal to be recorded on said magnetic tape to be fed at 1/N times said predetermined speed to provide a recording signal having the predetermined recording rate;
- a circuit which multiplexes an identification signal for identifying said selected digital information signal having different information rates or said feed speed of the magnetic tape, on said digital information signal to be recorded, for encoding; and wherein said decoder comprises:

- a circuit which detects the multiplexed identification signal to identify an original of said selected digital information signal based on the detection result.

8. A digital information recording apparatus according to claim 7, wherein said recorder and reproducer comprises:

- a circuit which records, said digital information signal to be recorded on said magnetic tape to be fed at said predetermined feed speed, to four tracks on said magnetic tape per one revolution of a rotary-drum; and
- a circuit which records, said digital information signal to be recorded on said feed tape to be fed at 1/N times said predetermined feed speed, to four tracks on said magnetic tape per N revolutions of said rotary drum.

* * * * *